United States Patent [19]
Chen et al.

[11] Patent Number: 5,122,317
[45] Date of Patent: Jun. 16, 1992

[54] METHOD OF SUPERPLASTICALLY DEFORMING ZIRCONIA MATERIALS

[75] Inventors: I-Wei Chen, Ann Arbor; Chinmau J. Hwang, Midland, both of Mich.

[73] Assignee: The Regents of the University of Michigan, Ann Arbor, Mich.

[21] Appl. No.: 779,130

[22] Filed: Oct. 16, 1991

Related U.S. Application Data

[63] Continuation of Ser. No. 464,106, Jan. 12, 1990, abandoned.

[51] Int. Cl.$^5$ .............................................. C04B 35/48
[52] U.S. Cl. ........................................ 264/60; 264/65; 264/325; 264/332
[58] Field of Search ................... 264/60, 65, 325, 332

[56] References Cited

U.S. PATENT DOCUMENTS

| | | |
|---|---|---|
| 3,287,143 | 11/1966 | Yavorsky . |
| 3,293,053 | 12/1966 | Alper et al. . |
| 4,279,655 | 7/1981 | Garvie et al. . |
| 4,565,792 | 1/1986 | Knapp . |
| 4,784,818 | 11/1988 | Wakai et al. . |
| 4,786,448 | 11/1988 | Fukuhara et al. . |
| 4,849,142 | 7/1989 | Panda et al. . |

OTHER PUBLICATIONS

"Superplastic Bulging of Fine Grained Zirconia", by Xin Wu and I-Wei Chen, presented at 91st Annual Meeting of American Ceramic Society, Paper 124-B-89 (Apr. 23-27, 1989).

"Mechanistic Studies of Pressure-Assisted Superplasticity of Structural Ceramics", by I-Wei Chen, Progress and Forecast Report to Air Force Office of Scientific Research (Jan. 15, 1989).

"Effect of a Liquid Phase on Superplasticity of 2m/oY$_2$O$_3$-Stabilized Tetragonal Zirconia Polycrystals", by Chin-Mau James Hwang and I-Wei Chen, presented at 91st Annual Meeting of American Ceramic Society, Paper 121-B-89 (Apr. 23-27, 1989).

"Preparation of Low-Y$_2$O$_3$-TZP by Low-Temperature Sintering", by N. Kimura, H. Okamura, and J. Morishita, Advances in Ceramics, vol. 24, pp. 183-191: Science and Technology of Zirconia III (1988).

Excerpts from "Superplasticity of Zirconia Toughened Ceramics", Dissertation for the Degree of Doctor of Engineering to Department of Industrial Chemistry, Faculty of Engineering, Kyoto University by Fumihiro Wakai (1988) (pp. 1-3, 196-203).

"Mechanistic Studies of Pressure-Assisted Superplasticity of Structural Ceramics", by I-Wei Chen, Annual Tech./Scientific Report to Air Force Office of Scientific Research (Jul. 15, 1988).

"Non-Newtonian Flow and Micrograin Superplasticity in Ceramics", by Fumihiro Wakai, MRS Int'l. Mtg. on Adv. Mats., vol. 7, pp. 225-232 (1989).

"High Ductilities, Superplastic Behaviors and Associated Mechanisms in Fine Grained Ceramics", by C. Carry, MRS Int'l. Mtg. on Adv. Mats., vol. 7, pp. 199-215 (1989).

"Fine Grained Yttria-Stabilized Tetragonal Zirconia - an Example of a Superplastic Ceramic", by T. G. Nieh, J. Wadsworth, and O. D. Sherby, MRS Int'l. Mtg. on Adv. Mats., vol. 7, pp. 251-258 (1989).

"Superplasticity of Zirconia Toughened Ceramics-A Dissertation for the Degree of Doctor of Engineering to Department of Industrial Chemistry Faculty of Engineering Kyoto University", by Fumihiro Wakai, 1988.

*Primary Examiner*—James Derrington
*Attorney, Agent, or Firm*—Harness, Dickey & Pierce

[57] ABSTRACT

A method for deforming a ceramic compound by doping a zirconia ceramic material with an effective amount of a transition metal and superplastically deforming the material.

13 Claims, No Drawings

METHOD OF SUPERPLASTICALLY DEFORMING ZIRCONIA MATERIALS

This invention was made with Government support under Grant NO. AFOSR-87-0289 awarded by the Air Force Office of Scientific Research. The Government has certain rights in the invention.

This is a continuation of U.S. patent application Ser. No. 07/464,106, filed Jan. 12, 1990, now abandoned.

BACKGROUND OF THE INVENTION

1. Field of the Invention

The present invention relates to deformation of ceramic materials, and more particularly to superplastic deformation of zirconia ceramic materials.

2. Description of Related Art

Ceramic materials, such as zirconia ($ZrO_2$) ceramic materials, have gained increased attention in recent years as an important material for many commercial applications. Growing numbers of ceramic material applications in the aerospace automotive and tool and die industries, for example, have increased the need for materials producers to fabricate improved ceramic materials. Manufacturing methods such as stretching, bending, bulging, extruding, or forging of sheet or bar stock materials have been employed to manufacture such ceramic materials. Unfortunately, absent special measures, such methods tend to result in relatively low yields of useful ceramic articles.

Superplastic deformation methods have been employed in connection with many metallic materials to fabricate useful articles. By "superplastic deformation", as used herein, is meant the relatively extensive deformation (e.g. greater than about 50% in compression or elongation) of a material at a relatively low stress under a relatively high strain rate. Until the present invention, however, superplastic deformation methods used to fabricate ceramic materials, such as zirconia ceramic materials, have required relatively extreme operating conditions. That is, relatively high deformation temperatures, or relatively low strain rates have typically been required in order to deform zirconia compounds under a given stress. From a commercial standpoint, however, such operating ranges tend to render superplastic deformation methods impractical as used with ceramic materials, such as zirconia ceramic materials.

SUMMARY OF THE INVENTION

A method is disclosed for deforming a ceramic material. A zirconia ceramic material doped with an effective amount of a doping agent is provided. The zirconia ceramic material is superplastically deformed.

The present invention relates to the discovery that the addition of an effective amount of a doping agent (i.e. "dopant") to a zirconia ceramic material significantly improves the superplastic deformation characteristics of the material. As a result, superplastic deformation of zirconia ceramic materials, and particularly popularly employed yttria-stabilized tetragonal zirconia polycrystal materials ("TZP"), can be accomplished efficiently within commercially desirable temperature ranges, relatively low stresses, and relatively high strain rates. The operating conditions achievable using the present method are particularly attractive to potentially reduce the wear of tooling and machinery and thereby reduce the cost of such tooling, machinery, and other equipment necessary for deforming the present materials. Additionally, potentially reduced process times, achievable using the present method, are attractive from the standpoint of reducing processing and operating costs. The resulting deformed ceramic materials generally exhibit substantially no degradation to mechanical properties, and macrostructures and microstructures of relatively high integrity. The materials are thus rendered useful in a number of applications heretofore impractical using art-known materials.

DETAILED DESCRIPTION OF THE PREFERRED EMBODIMENT

A method for deforming a ceramic material includes the steps of:

(a) providing a zirconia ceramic material doped with an effective amount of a doping agent; and (b) deforming the zirconia ceramic material.

By "zirconia ceramic material" or "base material" as used herein is meant a ceramic material that includes zirconia. In one aspect of the present invention, it is preferred that the zirconia ceramic material is a zirconia-based ceramic material which means that the zirconia ceramic material is present in a major amount (i.e. greater than about 50 percent by weight of the base material). However, in an alternative aspect, it is possible that the base material also includes amounts up to about 90 volume percent of a material selected from alumina, mullite, or mixtures thereof.

It is contemplated that the method of the present invention may be practiced in connection with variety of zirconia ceramic material types (e.g. monoclinic, or cubic). The zirconia ceramic material of the above step (a), however, is preferably a zirconia-based ceramic material, and still more preferably is a tetragonal zirconia polycrystal ("TZP") base material. Preferably, the TZP base materials employed in the present method are at least partially stabilized in a tetragonal crystal structure by the addition of one or more suitable stabilizers. Accordingly, examples of preferred stabilizers for use in the TZP-base materials of the present method include yttria ($Y_2O_3$) (in an amount of about 1.5 to about 6 mole percent of the base material), indium oxide ($In_2O_3$), scandium oxide ($Sc_2)_3$), calcium oxide (CaO), magnesium oxide (MgO) cerium oxide ($CeO_2$), suitable rare earth oxides or mixtures thereof. The stabilizers are preferably present in the TZP-base material in an amount of about 0 to about 20 mole percent of the overall TZP base material. Other additives may likewise be present in addition to, or alternative to, the above stabilizers and may be selected from additives such as hafnium oxide ($HfO_2$), titanium oxide ($TiO_2$), niobium oxide ($Nb_2O_3$), tantalum oxide ($Ta_2O_3$) and mixtures thereof. Examples of suitable commercially available yttria-stabilized zirconia base materials include TZ-2Y and TZ-3Y powder supplied by TOSOH Co. Ltd., Tokyo, Japan.

The base materials of the above step (a) are preferably provided initially in a powder form, wherein the stabilizers are distributed substantially uniformly throughout the powder. Thus, the base material may be prepared using known methods such as those disclosed in U.S. Pat. No. 4,849,142 which is hereby expressly incorporated by reference. Examples of alternative suitable methods of preparing such powders include methods such as chemical vapor deposition methods, methods involving rapid quenching of a fused oxide melt, hydrothermal reaction methods, methods involving oxidation of metal fine particle smoke, or methods involving freeze-drying of a mixed salt solution. Preferably, the base material of the above step (a) has an average particle size ranging from about 0.002 microns to about 0.1 microns, and more preferably from about 0.02 microns to about 0.05 microns.

The base material of step (a) above is doped with an effective amount of a doping agent (i.e. "dopant") for improving the superplastic deformation characteristics of the base material. By "effective amount", as used herein, is meant an amount of a dopant sufficient to show a significant and reproducible improvement in one or more superplastic deformation characteristics of the base material, while generally preserving the integrity of the mechanical properties, and microstructure and macrostructure of the base material. For instance, it is contemplated that the doping of the present base material with the present dopant will result in a material that exhibits (1) a reduction of the temperature required for the successful superplastic deformation of the material; (2) a reduction of the stresses required for superplastic deformation of the material; or (3) an increase in the strain rate achievable by superplastic deformation of the material.

Accordingly, for the preferred methods disclosed herein, an effective amount of a dopant generally refers to the addition of one or more dopants in an amount less than about 5 mole percent dopant of the resulting overall composition; preferably in the range of about 0.05 to about 5 mole percent; more preferably in the rang of about 0.1 to about 2 mole percent; and most preferably in the range of about 0.2 to about 1 mole percent.

It should be noted that it is possible that some commercially available base materials may already contain trace amounts of dopants in the form of impurities. In those instances, the present methods contemplate supplementing the base material with a controlled and substantially uniform distribution of the present dopants so that improved superplastic deformation characteristics are achievable.

Preferred dopants of the present method are the transition metal elements, and more particularly are elements selected from the group consisting of manganese (Mn), iron (Fe), cobalt (Co), nickel(Ni), copper (Cu), zinc (Zn) and mixtures thereof. A more preferred dopant is selected from the group consisting of Mn, Fe, Cu, Zn and mixtures thereof. The most preferred dopant is selected from the group consisting of Mn, Cu and mixtures thereof.

To facilitate the step of doping the above dopant into the base material, it is preferable that the dopant is provided initially not as a free element, but in the form of a dopant compound. Thus, preferred dopant compounds of the present method are compounds that include one or more of the above dopant elements, and may be selected from compounds such as oxides, carbonates, oxalates, nitrates acetates, citrates, hydroxides, chlorides, organometallic compounds or mixtures thereof. More preferably, a preferred type of compound is a transition metal oxide compound, such as one containing an element selected from the group consisting of Mn, Fe, Co, Ni, Cu, Zn and mixtures thereof. In this regard it is highly preferable that the present oxide is selected from the group consisting of $MnO_2$, $Fe_2O_3$, CoO, NiO, CuO, ZnO and mixtures thereof. In an even more preferred embodiment the oxide compound is selected from $MnO_2$, CuO, or mixtures thereof.

It is contemplated that the present preferred oxides may contain the dopant elements in one or more different oxidation states. Thus, it is possible that the present compounds may include mixtures of compounds that stoichiometrically contain differing numbers of oxygen atoms per dopant element atom.

The step of doping the base material may be accomplished in any suitable manner. The base material may be doped prior to or after densification steps discussed herein. A preferred method, however, includes mixing the dopant with the base material prior to densification, while both are in a powder form. In this regard, one preferred technique is to prepare, in a suitable container (such as an alumina jar), a slurry. Preferably the slurry includes a predetermined amount of the base material, an effective amount of the dopant, and one or more predetermined amounts of a liquid vehicle.

It should be appreciated that some compounds containing the present dopant are provided in the form of liquid solution, such as a nitrate or acetate dissolved in water, or an oxide dissolved in a nitric acid. In such instances, to dope the base material and obtain a powder suitable for introduction into the slurry, the solution preferably is admixed with the base material to cause interaction between the base material and the dopant. The resulting admixture may be treated, using any suitable known method, to evaporate the liquid and dry the resulting powder. The dried powder preferably should be further heated (i.e. calcined). The powder obtained after calcination can then be introduced into the slurry discussed above and processed according to the methods outlined herein.

It should be noted that, in regard to the above steps, a preferred liquid vehicle is water. Distilled water may optionally be employed. In turn, the concentration of water in the slurry is preferably about 60 to 95 volume percent of the overall slurry composition. The amount of water in the slurry composition, however, can be varied depending upon any of several factors such as the powder particle sizes employed, the type of surfactants employed, the desired pH value, or the like. However, it is preferred that the concentration of water is such that it will result in a pH of the slurry in the range of about 8 to about 10, and more preferably about 9.5. It is also preferred that the solid loading of the slurry (i.e. the portion of the slurry including the base material and the dopant) is in the range of about 5 to about 40%, and more preferably about 20%.

In addition to the above slurry constituents, it is also preferable to include in the slurry a suitable surfactant. The choice of surfactant employed may vary depending upon the liquid vehicle used in the slurry. Preferably the surfactants employed in the present preferred method are substantially soluble in the liquid vehicle. In a preferred embodiment, where the liquid vehicle is water, the surfactant preferably is an alkali or ammoniated salt of an anionic surfactant. Particular examples of suitable surfactants thus include ammoniated polyacrylic acid (such as commercially available Darvan 821A supplied by R. T. Vanderbilt, Inc.), sodium-polymethacrylic acid, polyvinylpyrrolidone or the like.

It will be appreciated that any suitable quantity of surfactant may be employed in the present method. The quantity of surfactant, in turn, may be varied according to a number of factors such as the particle size of the powders employed in the present method. Accordingly, a preferred amount of surfactant in the slurry is preferably in the range of about 1 to about 4 percent by weight of the total powder content of the slurry, and more preferably about 1.5 to about 3.0 percent by weight of the total powder content.

Also provided within the alumina jar are a plurality of zirconia balls for assisting in milling the slurry. The balls have one or more predetermined diameters that can be suitably varied to affect the ultimate size of particles resulting from the milled slurry. Thus a preferred range of zirconia ball diameters is about 1 to about 3 mm. It should be appreciated that the balls used in this step need not be composed of zirconia. Examples of alternative suitable ball materials would thus include, alumina, silicon nitride, or the like.

The slurry composition is admixed using known methods, such as attrition milling methods, for one or more predetermined amounts of time to obtain a substantially homogeneous admixture of the dopant and the base material, and possibly to obtain a relatively uniform distribution of one or more predetermined particle sizes in the resulting powder admixture. For example, to obtain a powder particle size finer than about 0.1 micron it is preferable to attrition mill the slurry for about two hours.

It should be appreciated that the above milling step may be used in combination with, or may be substituted with, any suitable step for achieving adequate powder particle admixing and particle size reduction. Examples of alternative or supplemental admixing or grinding techniques include, without limitation, ball milling, jet milling, dry mixing, or vibratory milling methods.

Moreover, the dopant of the present invention alternatively may be introduced selectively into the base material in its elemental or ionic form using known surface treatment methods such as heat treating after dip coating, sintering in a powder pack, ion implantation, and the like. These methods may be employed advantageously in instances when a dopant concentration gradient, or a plurality of different types of dopants are desired at or near the surface of the base material. Such surface treatment steps are particularly attractive for achieving improved superplastic deformation characteristics at or near the surface of the material, or for alteration of surface or physical characteristics, including the surface appearance of the material.

Base materials that are doped according to the present method can be processed into densified articles. For instance, after suitably admixing the slurry containing the doped base material, the solids of the slurry preferably are formed or compacted into a configuration that is suitable for relatively easy handling in subsequent processing steps. Thus, the slurry can be pressure slip cast into one or more predetermined configurations.

In the present preferred embodiment, the milled slurry preferably is pressure slip cast at a pressure of about 0.3 to about 13 MPa, and more preferably about 1 MPa, into a cake configuration, such as a cake having a diameter of about 5 cm. The green density of the slip cast cakes thus is preferably in the range of about 50 to about 65% of the theoretical density.

The slip cast cakes are dried, to substantially evaporate liquids in the cake, by any suitable technique, such as by heating at a temperature of about 30 to about 120° C. for one or more predetermined amounts of time, preferably ranging from about 1 to about 7 days. Further compaction of the present cake can be accomplished by isostatically pressing the cake at a pressure in the range of about 200 MPa to about 400 MPa so as to obtain a density in the range of about 60 to about 65% of the theoretical density.

It should be appreciated that alternative suitable compaction methods, other than pressure slip casting and isostatic pressing methods, may be employed for forming predetermined configurations of a predetermined green density. In this regard, examples of alternative compaction and shaping techniques might include centrifuging, injection molding, die pressing, colloidal pressing, or the like.

To even further densify the doped base material, preferably it is sintered in a suitable furnace according to a predetermined sintering schedule. That is, the doped base material is sintered for one or more predetermined amounts of time at one or more predetermined temperatures to obtain a density that is at or near the theoretical density. In this regard, preferably the doped base material is sintered to a density in the range of about 90 to about 100% of the theoretical density, and more preferably to a density in the range of about 99 to about 100% of the theoretical density.

Sintering may take place in any suitable atmosphere. For example, sintering may occur in an air atmosphere. Examples of other suitable atmospheres that may be employed in addition to, or alternative to, the air atmosphere include atmospheres having oxygen, water-saturated air, nitrogen, argon, helium or mixtures thereof. The atmosphere in the furnace for sintering preferably is maintained at a pressure ranging from about 0 atm to about 1 atm. Sintering times preferably rang from about 10 minutes to about 3 hours and more preferably from about 20 minutes to about one hour. The sintering temperature, however, should preferably range from about 1000° C. to about 1300° C., and more preferably about 1100° C. to about 1200° C. The sintering temperature may vary, however, depending upon factors such as the type or amount of dopant employed, the sintering atmosphere, the heating rate, and the heating method. Examples of heating methods suitable for use in the present method include known methods such as plasma, microwave, ordinary furnace heating, gradient furnace heating methods or the like.

Preferably, however, the sintering conditions selected for the present method should be sufficient to produce a sintered material having a relatively uniform distribution of fine substantially equiaxed grains (e.g. having a grain size ranging from about 0.05 to about 1.0 microns, and more preferably about 0.1 microns); a substantially uniform microstructure; and a relatively insignificant amount of porosity.

Referring to the above step (b), deformation of the doped base material, either in tension or compression, can be accomplished in a number of suitable manners. For example, without limitation, commonly employed deformation methods may be employed in the present methods such as extrusion, hot rolling, forging, sinter forging, bending, stretch forming, sintering, punching, deep drawing, gas pressure blowing, or the like.

Moreover, any suitable combination of deformation temperature, flow stress or strain rate may be employed. Preferably, however, the present deformation step is carried out to efficiently accomplish superplastic deformation. Thus, preferably the step is carried out at the lowest temperature and flow stress possible, and the highest strain rate possible. It is also preferable that the step is carried out in a manner sufficient to substantially preserve the integrity of the mechanical properties, and the macrostructure and the microstructure of the resulting deformed zirconia ceramic material.

It is thus preferred that the present deformation step is carried out at one or more predetermined deformation temperatures in the range of about 1000° C. to about 1300° C., and more preferably at a temperature below about 1200° C. To achieve these temperatures in the material to be deformed, it is preferable that the material is preheated in a suitable manner to the deformation temperature for a predetermined amount of time prior to deformation. The time required for preheating will depend upon a number of factors including the size and shape of the material being heated. For instance, the step of preheating the present preferred cakes (discussed above) preferably includes maintaining the doped base material at about the proposed deformation temperature for a time period of about 5 to about 20 minutes. Examples of methods suitable for heating the doped base material include known methods such as furnace heating, induction heating, microwave heating or the like.

Any suitable flow stress may be applied to the doped base material to accomplish superplastic deformation. Preferably, however, the flow stress for the present deformation step is at least about 5 MPa, and more preferably is in the range of about 5 MPa to about 100 MPa, and still more preferably is in the range of about 10 MPa to about 30 MPa. The preferred strain rate, likewise, can be as much as $10^{-4}$/sec or higher. More preferably the strain rate ranges from about $10^{-4}$/sec to about $10^{-2}$/sec. Still more preferably, the strain rate is maintained substantially constant at about $3 \times 10^{-4}$/sec to about $3 \times 10^{-3}$/sec.

Deformation may be carried out in any suitable atmosphere. Preferably, however, deformation is carried out in an atmosphere containing air, argon, or mixtures thereof.

Deformation of the present doped base materials may be accomplished using suitable tooling in any suitable manner. In one preferred aspect of the present methods, the doped base material is placed on a suitable support structure, such as a portion of a die or a flat platen. Optionally, the doped base material may be clamped or otherwise secured to the support structure.

Pressure from an external source is applied to the doped base material. For example, pressure can be provided to the die by driving a piston, associated with the punch or die, with a load that is controllable through known screw, hydraulic or pneumatic methods.

Preferably the dies employed to accomplish deformation in the present methods are fabricated from a material suitable for withstanding the conditions experienced during superplastic deformation of zirconia ceramics. In this regard, examples of suitable die materials for use in an air deformation atmosphere include silicon carbide, alumina, mullite, known superalloys, or the like. Examples of die materials suitable for employment in a substantially inert atmosphere, on the other hand, include graphite, boron nitride, alloys containing one or more of molybdenum and tungsten, or the like.

When gas blowing methods are employed in the present invention, it is preferred that a contoured mold, against which the doped base material can be blown, is provided. A suitable gas (e.g. air, argon, or the like) is introduced under pressure to the doped base material, which is heated as described herein, to accomplish blowing.

Strain rates and pressures or stresses employed in the above deformation steps can be monitored or controlled by known methods, such as methods employing direct observation of tooling displacement, and the use of a load cell or a pressure gauge.

Without intending to be bound by theory, it is believed that the presence of an effective amount of the present dopant in zirconia ceramic materials contributes to the formation of a thin, wetting, grain boundary phase within the microstructure of the materials that are doped according to the method of the present invention. The grain boundary phase, in turn, is believed to enhance the superplastic deformation characteristics of doped base materials by permitting superplastic deformation at relatively low temperatures and flow stresses, and relatively high strain rates.

Superplastically deformed articles prepared according to the present method are useful in a variety of specific applications such as bearings, extrusion dies, gas-turbine disks, valves, vanes, rings, cutting tools, cutting blades, knife edges, and the like. Accurately shaped articles of complicated configurations can be used advantageously also as automobile engine parts and other structural parts.

Moreover, it is contemplated that the method of the present invention could be employed in combination with known diffusion bonding methods to permit the formation of relatively complex-shaped components that incorporate the present doped base materials, thereby further increasing the number of useful applications for such articles. For instance, without limitation, a preferred method of combining deformation and diffusion bonding techniques is to deform a plate into a corrugated shape, and then selectively diffusion bond the plate to a second plate in predetermined locations. It is also contemplated that two flat plates can be diffusion bonded to secure the plates together in a number of predetermined locations, and then the space between the plates can be enlarged (such as by blowing) to form a honeycomb-like structure.

The method of the present invention is illustrated in the following examples.

EXAMPLE 1

Two materials are prepared. The first material includes a 2Y-TZP base material, having about 2 mole percent $Y_2O_3$, doped with about 0.3 mole percent CuO and is prepared by attrition milling an admixture of 2Y-TZP and CuO in an alumina jar, using a zirconia milling media and a surfactant. The milled slurry is pressure slip cast into cakes, which are dried and isostatically pressed at about 400 MPa. Sintering is performed at about 1200° C. for about 1 hour to achieve a density of about 99.5%.

The second material is substantially the same material as the first material but does not include the CuO dopant. It is sintered at about 1350° C. for 1 hour to achieve a density of about 99.5% and a grain size substantially similar to that of the first material. The first and second materials are heated to a temperature of about 1150° C. Both materials are then superplastically deformed in air to more than 100% in compression at a strain rate of about $10^{-4}$/sec. Successful superplastic deformation of the doped first material occurs at a flow stress of about 20 MPa. A flow stress of about 430 MPa is required to successfully superplastically deform the second material.

EXAMPLE 2

The materials of Example 1 are superplastically deformed at a flow stress of about 30 MPa and a strain rate of about $10^{-3}$/sec. The first material is successfully superplastically deformed at a temperature of about 1200° C. The second material requires a temperature of about 1400° C. for successful superplastic deformation.

EXAMPLE 3

The first material of Example 1 is superplastically biaxially shell stretched from a flat disk (clamped to a die using an annular hold-down clamp), of about 1 mm thickness, to a hemispherical shell, using a SiC punch, at a temperature of about 1150° C. in air. A flow stress of about 30 MPa is required at a strain rate of about $10^{-3}$/sec. A shiny surface finish is observed and evidences no apparent macroscopic damage to the ceramic. The biaxial tensile strain at the pole of the hemispherical dome is about 70%.

EXAMPLE 4

Two materials are prepared in the same manner as outlined for the first material in Example 1, but with about 0.3 mole percent CuO in the first material, and with about 1.0 mole percent CuO in the second material of the present Example. The first material is successfully superplastically deformed at a flow stress of about 30 MPa at about 1100° C. and a strain rate of about $1 \times 10^{-4}$/sec. Under the same temperature and stress conditions the strain rate of the second material is about $4 \times 10^{-4}$/sec.

EXAMPLE 5

With a set of matching jigs of silicon carbide, one of which contains a circular groove, the disk of Example 3 is pressed at about 30 MPa, at 1150° C., and at a rate of about $5 \times 10^{-4}$/sec to form a corrugated disk.

EXAMPLE 6

The first material of Example 1 is reheated at about 1250° C. to obtain grain sizes ranging from less than about 0.2 to about 0.4 micron. The material is superplastically deformed in compression at temperatures ranging from about 1000° C. to about 1250° C., at strain rates ranging from about $10^{-4}$ to about $10^{-2}$ sec. rate sensitivities ranging from about 0.5 to about 0.8 are observed. The strain rate sensitivity is also observed to decrease with increasing temperature. Strain rate sensitivity ("m") is defined as $$m = \frac{\partial \ln \sigma}{\partial \ln \dot{\epsilon}}$$

where $\sigma$ denotes stress and $\dot{\epsilon}$ denotes the strain rate. A grain size exponent ("p") is also observed as ranging between about 1.2 and about 1.6. It is also observed that the grain size exponent decreases with increasing temperatures. The grain size exponent is defined as $$p = \frac{\partial \ln \dot{\epsilon}}{\partial \ln d}$$

where d is the grain size. The microstructure of the material is substantially unchanged after about 100% deformation.

EXAMPLE 7

A first material and a second material are prepared in substantially the same manner as the materials of Example 1 except for the substitution of about 0.3 mole percent $MnO_2$ for the CuO in the first material. At a temperature of about 1250° C., a flow stress of about 10 MPa, and a strain rate of about $10^{-4}$/sec, successful superplastic deformation is observed for the first material. To superplastically deform the second material (without a dopant) under the same temperature and strain rate conditions, a flow stress of about 45 MPa is needed.

Although the invention has been described with particular reference to certain preferred embodiments thereof, variations and modifications can be effected within the spirit and scope of the following claims.

What is claimed is:

1. A method for superplastically deforming an yttria-stabilized tetragonal zirconia-based ceramic material, said method comprising the steps of:
   (a) providing an yttria-stabilized zirconia-based ceramic-base material including about 1.5 to about 6 mole percent of yttria;
   (b) doping said yttria-stabilized zirconia-based ceramic material with about 0.1 to about 2 mole percent, of the total composition, of a compound containing an element selected from the group consisting of Mn, Fe, Co, Ni, Cu, Nz, and mixtures thereof to form a doped zirconia-based ceramic-base material, the amount of said compound being sufficient to permit superplastic deformation to occur at a flow stress of about 10 MPa to about 30 MPa, a strain rate of about $3 \times 10^{-4}$/sec to about $3 \times 10^{-3}$/sec, and a temperature below about 1250° C.;
   (c) milling said doped zirconia-based ceramic-base material for a predetermined amount of time;
   (d) pressure slip casting said doped zirconia-based ceramic material;
   (e) isostatically pressing said doped zirconia-based ceramic material to a density of about 50 to about 65%;
   (f) sintering said doped zirconia-based ceramic material at a temperature in the range of about 1000° C. to about 1300° C. to achieve a density of about 90% to about 100% of the theoretical density; and
   (g) superplastically deforming said doped zirconia-based ceramic material at a flow stress of about 10 MPa to about 30 MPa, a strain rate of about $3 \times 10^{-4}$/sec to about $3 \times 10^{-3}$/sec, and a temperature below about 1250° C.

2. The method according to claim 1 wherein said compound of said doping step (b) is selected from the group consisting of oxides, carbonates, oxalates, nitrates, acetates, citrates, hydroxides, chlorides, organometallic compounds, and mixtures thereof.

3. The method according to claim 2 wherein said compound of said doping step (b) is a compound containing an element selected from the group consisting of Mn, Cu, and mixtures thereof.

4. The method according to claim 1 wherein said compound of said doping step (b) is an oxide selected from the group consisting of Mn, Fe, Co, Ni, Cu, Zn, and mixtures thereof.

5. The method according to claim 1 wherein said compound of said doping step (b) is an oxide containing an element selected from the group consisting of Mn, Cu, and mixtures thereof.

6. The method according to claim 1 wherein said compound of said doping step (b) is doped in an amount of about 0.2 to about 1 mole percent of the total composition.

7. A method for superplastically deforming a ceramic material, said method comprising the steps of:
(a) preparing a densified tetragonal zirconia ceramic-base material doped with a cooper compound in an amount of about 0.1 to about 2 mole percent, of the total composition; and
(b) superplastically deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

8. A method for superplastically deforming a ceramic material, said method comprising the steps of:
(a) preparing a densified tetragonal zirconia ceramic-base material doped with a zinc compound in an amount of about 0.1 to about 2 mole percent, of the total composition; and
(b) superplastically deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

9. A method for superplastically deforming a ceramic material, said method comprising the steps of:
(a) preparing a densified tetragonal zirconia ceramic-base material doped with a cobalt compound in an amount of about 0.1 to about 2 mole percent, of the total composition; and
(b) superplastically deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

10. A method for superplastically deforming a ceramic material, said method comprising the steps of:
(a) preparing a densified tetragonal zirconia ceramic-base material doped with a Iron compound in an amount about 0.1 about 2 mole percent, of the total composition; and
(b) superplasticaly deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

11. A method for superplastically deforming a ceramic material, said method comprising the steps of;
(a) preparing a densified tetragonal zirconia ceramic-base material doped with a nickel compound in an amount of about 0.1 to about 2 mole percent of the total composition; and
(b) superplastically deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

12. A method for superplastically deforming a ceramic material, said method comprising the steps of:
(a) preparing a densified tetragonal zirconia ceramic-base material doped with a manganese compound in an amount of about 0.1 to about 2 mole percent, of the total composition; and
(b) superplastically deforming said doped tetragonal zirconia-based ceramic material at a flow stress of about 10 MPa to about 30 MPa, a strain rate of about $3 \times 10^{-4}$/sec to about $3 \times 10^{-3}$/sec and a temperature below about 1250° C.

13. A method according to claim 12 further comprising a copper compound.

* * * * *

UNITED STATES PATENT AND TRADEMARK OFFICE
CERTIFICATE OF CORRECTION

PATENT NO. : 5,122,317
DATED : June 16, 1992
INVENTOR(S) : I-Wei Chen and Chinmau J. Hwang It is certified that error appears in the above-identified patent and that said Letters Patent is hereby corrected as shown below:

Column 10, line 22, claim 1,
"Nz" should be --Zn--.

Column 11, line 4, claim 7,
"cooper" should be --copper--.

Column 12, line 4, claim 10,
"Iron" should be --iron--.

Column 12, line 5, claim 10,
before "about", insert --to--.

Signed and Sealed this

Nineteenth Day of April, 1994

*Attest:*

BRUCE LEHMAN

*Attesting Officer*  Commissioner of Patents and Trademarks